US012759512B2

(12) United States Patent
Wood et al.

(10) Patent No.: US 12,759,512 B2
(45) **Date of Patent: *Oct. 13, 2026**

(54) COLLAPSIBLE SNOW PADDLE AND METHOD OF USE

(71) Applicants: Stephen Patrick Wood, Reno, NV (US); Lorraine Lee Wood, Reno, NV (US)

(72) Inventors: Stephen Patrick Wood, Reno, NV (US); Lorraine Lee Wood, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/381,541

(22) Filed: Oct. 18, 2023

(65) Prior Publication Data

US 2024/0149841 A1 May 9, 2024

Related U.S. Application Data

(63) Continuation of application No. 18/182,259, filed on Mar. 10, 2023, now Pat. No. 11,827,190.

(60) Provisional application No. 63/318,690, filed on Mar. 10, 2022.

(51) Int. Cl.
*B60S 3/04* (2006.01)

(52) U.S. Cl.
CPC .................................... *B60S 3/045* (2013.01)

(58) Field of Classification Search
CPC ...... A47L 1/16; A47L 13/12; A47L 11/00–19; A47L 13/11; B60S 3/045
USPC ........................................ D32/48; 15/236.01
See application file for complete search history.

(56) References Cited

U.S. PATENT DOCUMENTS

| | | | | |
|---|---|---|---|---|
| 4,240,176 | A | 12/1980 | Farmer | |
| 4,317,250 | A | 3/1982 | Shutts | |
| 4,550,943 | A | 11/1985 | Mirto | |
| 4,865,372 | A * | 9/1989 | Gabriel | E01H 5/02 37/434 |
| D315,975 | S | 4/1991 | Huang | |
| 5,067,197 | A | 11/1991 | Cormier | |
| D338,090 | S | 8/1993 | Kamiyama | |
| 5,528,793 | A | 6/1996 | Schbot | |

(Continued)

FOREIGN PATENT DOCUMENTS

| | | |
|---|---|---|
| CA | 531947 | 7/2007 |
| CA | 885364 | 9/2016 |
| NZ | 419922-0001 | 8/2014 |

OTHER PUBLICATIONS

Snow Joe snow broom, Snowjoe website 2023, site visited Dec. 6, 2023, https://snowjoe.com/products/snow-joe-pro-led-lighted-4-in-1-snow-broom-ice-scraper (8 pages).

(Continued)

*Primary Examiner* — Katina N. Henson
(74) *Attorney, Agent, or Firm* — Holland & Hart LLP

(57) ABSTRACT

A collapsible snow paddle. The paddle includes an elongated handle, a rotatable coupling affixed to one end of the handle, and a generally planar snow remover, the rotatable coupling affixed to a rear surface of the remover so that the remover may be collapsed against the handle for storage and extended transverse to the handle for use. The snow remover may have a scraper edge inclined at an angle relative to the surface of the snow remover for scraping ice and a relatively soft capped edge for removing snow.

29 Claims, 15 Drawing Sheets

(56) References Cited

U.S. PATENT DOCUMENTS

| | | | |
|---|---|---|---|
| D444,952 S | 7/2001 | Mason, Jr. | |
| D515,758 S | 2/2006 | Turchi et al. | |
| D640,432 S | 6/2011 | Jackson | |
| D703,406 S | 4/2014 | Meyer | |
| 9,109,336 B1 | 8/2015 | Firth | |
| 9,113,767 B1 | 8/2015 | Hensel | |
| D804,123 S | 11/2017 | Orsino | |
| D1,001,405 S | 10/2023 | Li | |
| 11,827,190 B2 | 11/2023 | Wood et al. | |
| 2004/0025278 A1 | 2/2004 | Sander | |
| 2007/0187964 A1 | 8/2007 | Marble | |
| 2013/0180544 A1 | 7/2013 | Nelson | |
| 2019/0358678 A1 | 11/2019 | Greenberger | |
| 2019/0375380 A1* | 12/2019 | Wood | A47L 1/16 |
| 2023/0180925 A1 | 6/2023 | Fornari | |

OTHER PUBLICATIONS

Sno Shark website reviews Feb. 13, 2019, Tineye image results Jul. 14, 2019, site visited Dec. 6, 2023, https://snoshark.com/products/snoshark-std-1-pack-without-bag (10 pages).
Omnexus—"Hardness of Plastic Materials"—material properties data; https//omnexus.specialchem.com/polymer-properties/properties/hardness-shore-d; 2016.
Foam Factory, Inc—Cross-Linked Polyethylene Datasheet—material properties data; 2017.

* cited by examiner

COLLAPSIBLE SNOW PADDLE AND METHOD OF USE

CROSS-REFERENCE TO RELATED APPLICATION

This application is a continuation of U.S. Non-Provisional patent application Ser. No. 18/182,259 entitled "Collapsible Snow Paddle and Method of Use," filed Mar. 10, 2023, which claims priority to U.S. Provisional Patent Application entitled "Collapsible Snow Paddle and Method of Use," Ser. No. 63/318,690, filed Mar. 10, 2022. All such prior applications are hereby incorporated by reference in their entirety. The present application also incorporates by reference in its entirety the Applicant's prior U.S. Patent Application entitled "Snow Paddle," Ser. No. 29/830,206, filed Mar. 10, 2022. It is to be understood, however, that in the event of any inconsistency between this specification and any information incorporated by reference in this specification, this specification shall govern.

FIELD OF TECHNOLOGY

This application relates to a collapsible snow paddle and method of use, particularly in removing snow or ice from a vehicle.

BRIEF ASPECTS OF THE BACKGROUND OF THIS SPECIFICATION

Snow removal from cars, trucks, and other vehicles has long presented a challenge. The challenge has long been particularly great when the accumulation of snow on the vehicle is substantial.

For example, in order to remove ice from a large vehicle front or rear window with an ice scraper, it can be difficult to reach the center area of the window unless the scraper is mounted to a long handle. Such scrapers exist, but their typically fixed length consumes substantial space when stored in the vehicle such as on a rear seat or on the floor adjacent the rear seat.

Some such scrapers have long included a snow brush mounted on the handle for brushing snow off the vehicle. The snow brush bristles are typically quite flexible in order to prevent the bristles from scratching the vehicle's outer surfaces when used to remove snow from them. The snow brush is therefore typically easily bent, including by resistance presented by snow on the vehicle. As a result, removing snow from the vehicle with the brush can be difficult and time consuming, especially when the snow is deep or wet and heavy.

When snow is deep or wet and heavy, one common snow removal technique has been to use a conventional fixed-length snow shovel or a smaller, collapsible snow shovel. Conventional fixed-length show shovels are bulky and consume substantial storage space in the vehicle. Many vehicles are too small for such shovels. Smaller, collapsible snow shovels consume less space and are storable in most cars and trucks. Such shovels commonly have a collapsible handle, a shovel extending from one end of the handle, and a T-shaped grip extending transversely from the opposite end of the handle. They have been made of a variety of materials, such as aluminum or plastic.

When snow is actively falling, it may be very cold, and removing snow from a vehicle for an extended period of time may cause discomfort. Conventional snow scrapers typically have a narrow scrapper portion that enables the snow scrapper to be stored. However, such snow scrappers may require many swipes to remove snow from the vehicle, which can be difficult and time consuming, increasing the discomfort of the user.

These types of collapsible snow shovels are still somewhat bulky due to the rigid shovel extending from one end of the collapsible handle. They have not included an integral window scraper, and they have required a somewhat horizontal snow shoveling technique which can be difficult to employ when snow is in difficult-to-reach areas such as on the roof of the car or in a truck bed.

The Rapala Folding Pack Shovel with Bag has a foldable handle that can be folded and rotated with respect to the shovel to abut the shovel. This product can be stored in its accompanying bag. When extended, the handle is short and only approximately 13-15 inches long. Thus, this product is difficult to use for snow removal, especially on larger vehicles. It also does not include an ice scraper suitable for use on vehicle windows. When collapsed, the handle bends to fold upon itself and then rotates to abut the shovel end, providing a relatively thick, space-consuming folded shovel.

The inventors previously developed a snow paddle described in U.S. Pat. No. 10,640,093, which granted on May 5, 2020, and which is incorporated by reference in its entirety. Limiting features of the snow paddle, which were not previously appreciated, included paddle width and surface area. Additional limiting features included the belief that paddle size must inherently be balanced against storage size.

BRIEF SUMMARY OF CERTAIN ASPECTS OF THIS SPECIFICATION

The inventors believe they have discovered at least some of the issues—and the severity of those issues—identified in the Background section above. The inventors have therefore invented a collapsible snow shovel, or paddle, providing an apparatus with a paddle (shovel) end opposite a window-scraper end.

In some embodiments, a collapsible handle is rotatably mounted to a paddle. In some instances, a rotatable mount is disposed on a back surface of the paddle intermediate the opposed paddle end and window-scraper end of the handle.

Some applications provide a handle that telescopes from a collapsed position to an extended position and vice versa. At least some such applications can thus provide a snow paddle with a relatively short handle when fully collapsed for storage while also providing a snow paddle with a relatively long handle when extended for use. Some embodiments provide a handle with three or more telescoping sections so that the handle can be adjusted to provide any of several differing handle lengths during use.

Some embodiments include a handle grip at the end of the handle opposite the paddle. The handle grip can extend transverse to a longitudinal axis of the handle.

Some applications include a hand grip tube mounted about the thickest of the telescope sections.

The collapsible handle can have an elliptical or oblong cross-section with opposed widened sides extending generally parallel to the longitudinal axis of the handle. Some such applications can provide greater torsional stability for the handle.

In some embodiments the snow paddle may have a substantially planar paddle surface. The paddle may be rotatable about the paddle mount on the handle from a fully extended open position generally transverse to the longitudinal axis of the handle to a fully closed position with its planar surface generally parallel to and abutting the handle. The paddle may include a relatively soft snow shovel cap along one edge.

Prior art versions of the edge cap utilized the edge cap to protect surfaces including surfaces of vehicles; the addition of the edge cap did not directly increase the effectiveness of a paddle at removing snow from a vehicle to any appreciable extent. One of the innovations of the present disclosure is the utilization of an oversized edge cap to increase the effectiveness of a snow paddle.

In some embodiments the paddle may include an edge cap removably but reliably and fixedly attached to the snow paddle for snow removal. The removable edge cap may be substantially wider than the snow paddle to enable the snow shovel cap to remove greater volumes of snow with a single swipe of the snow shovel. That is, the width of the edge cap is substantially longer than a width of the paddle such that the edge cap is capable of removing more snow than edge caps that have a width that is substantially the same as the paddle. The increased width of the edge caps described herein enables a user to remove a greater volume of snow with each swipe as compared to edge caps that have a width that is substantially the same as the central paddle, speeding up the snow removal process, decreasing the amount of time the user is exposed to the elements, and ultimately increasing user comfort.

In some embodiments, the edge cap can be removably mounted to the snow paddle blade by one or more cap mounting tabs extending from the surface of the snow paddle blade to penetrate mating tab apertures penetrating or passing through the edge cap. In some applications, the snow paddle blade may have one or more tabs extending from the front surface and back or rear surface of the snow paddle blade, and similarly the one or more such tabs can penetrate mating tab apertures penetrating or passing through the front and back or rear side of the edge cap. In some embodiments, one or more cap mounting tabs and tab apertures may be molded into the snow paddle blade and edge cap respectively, or vice versa as described above.

In some embodiments, one or more cap mounting tabs and tab apertures may be formed on the edge cap (extending inwardly within the interior of the edge cap) and snow paddle blade (penetrating or passing through the snow paddle blade) respectively.

In some embodiments, one or more cap mounting tabs and tab apertures may be molded into the snow paddle blade and edge cap respectively, or vice versa as described above.

In some embodiments, one or more replacement or differently shaped or otherwise formed or constituted edge caps can be removably mounted to the snow paddle blade. In some embodiments, an edge cap can be U-shaped and mounted to extend from, and surround, the lower edge of paddle blade and the opposed upwardly extending sides of the paddle blade, to thereby further expand the lateral width of the effective paddle shovel area upwardly along, and extending outwardly from, the paddle blade.

In the fully extended or open position, the snow paddle can be used to push or pull snow off of a surface such as a vehicle surface. For example, in some embodiments, the user can grip the handle with one or two hands to push or pull the paddle and thereby push or pull snow with either surface of the paddle. In some embodiments, the user can alternatively use a scraper edge opposite the snow shovel cap to scrape snow or ice off of a surface. In some instances, the user may position the scraper edge into snow on a surface and simultaneously use the scraper edge to scrape the surface and the paddle surface to push or pull snow off of the surface.

Some applications can allow the user to use the snow paddle with the handle telescoped to its minimum length and then grip the telescoped handle and scape snow or ice off of a surface with the paddle in either its collapsed or open position.

Embodiments can provide any or all of the features described above embodied in a unitary, light weight, and durable snow paddle and scraper that may be quite compact when telescoped and collapsed. Some embodiments can be small enough to store under a vehicle seat or in some other relatively small space in the vehicle.

There are other novel features and advantages of the disclosure of this specification. They will become apparent as this specification proceeds. In this regard, it is to be understood that the scope of the invention is to be determined by the claims as issued and not by whether it addresses an issue because it is set forth in the Brief Background or provides a feature because it is set forth in this Brief Summary.

BRIEF DESCRIPTION OF THE DRAWINGS

The preferred and other embodiments are disclosed in association with the accompanying Figures in which.

DETAILED DESCRIPTION

This Detailed Description describes some embodiments but is not limiting of the scope of the invention. Further, components of these embodiments may be mixed and matched in differing permutations and combinations.

Figure 1:
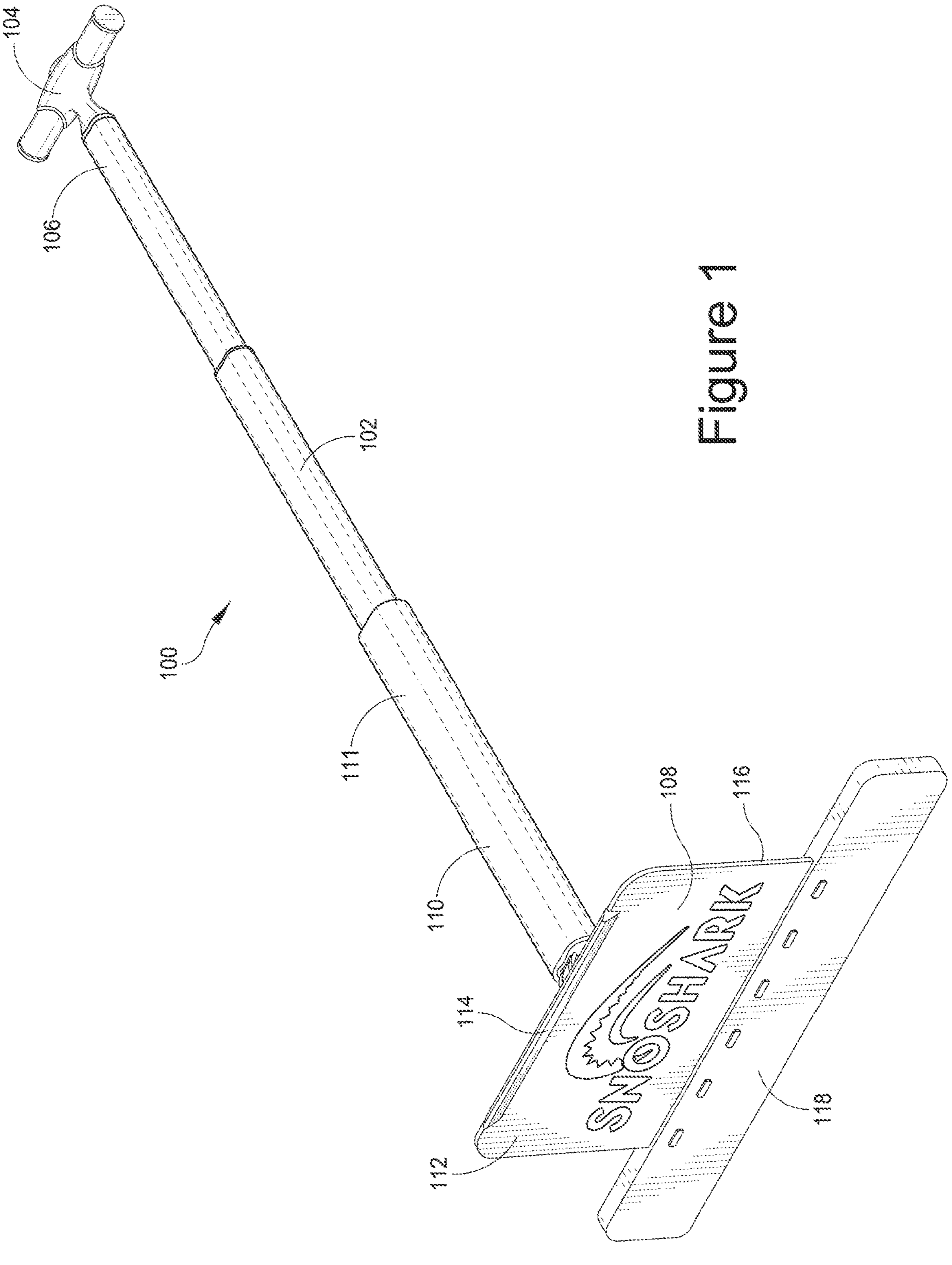
FIG. 1 is a perspective view of an embodiment of a fully extended collapsible snow paddle and ice scraper.

With reference now to FIG. 1, a fully extended, collapsible snow paddle, generally 100, has a telescoping handle 102 with a handle grip 104 at the handle's narrow end 106 and a snow paddle/scraper 108 at the handle's thickest, enlarged end 110. The handle grip 104 is transverse to a laterally-extending axis of the telescoping handle 102, and, in the extended, open position of FIG. 1, the snow paddle/scraper 108 is also generally transverse to the laterally-extending axis of the telescoping handle 102. A relatively soft, flexible, and resilient foam tube 111 is mounted about the handle's thickest, enlarged end 110 so that a user can grip the handle grip 104 with one hand and the enlarged end 110 through the foam tube 111 with the other hand.

The snow paddle/scraper 108 has a planar, somewhat rectangular, rigid central snow-removal paddle 112 with a laterally extending ice scraper edge 114 opposite a laterally extending lower edge 116. A relatively softer (as compared to the central snow removal paddle 112 and ice scraper edge 114), flexible, laterally extending, and resilient plastic lower edge cap 118 is mounted to surround the lower edge 116 of the central snow paddle 112 to prevent the lower edge 116 from scratching vehicle surfaces such as painted metal, windows, and seals.

The edge cap 118 is removable from, and replaceable on, the lower edge 116 central snow removal paddle 112. Thus, the edge cap 118 can be easily replaced with another edge cap of different shape or size, or removed for more convenient storage, as well as provide further revenue for a business directed to selling the snow paddle 100 and its replaceable edge cap 118. Differing sizes of edge caps, from narrower to much wider, can therefore be removably affixed to the snow removal paddle 112.

FIGS. 2-11 depict the basic snow paddle 100 of FIG. 1 with yet additional structure, such as an additional, outwardly and laterally extending sharpened but relatively thin scraper edge 114. In some embodiments, the scraper edge 114 is made of material more rigid than that of a relatively more flexible and soft central snow-removal paddle 112.

Figure 2:
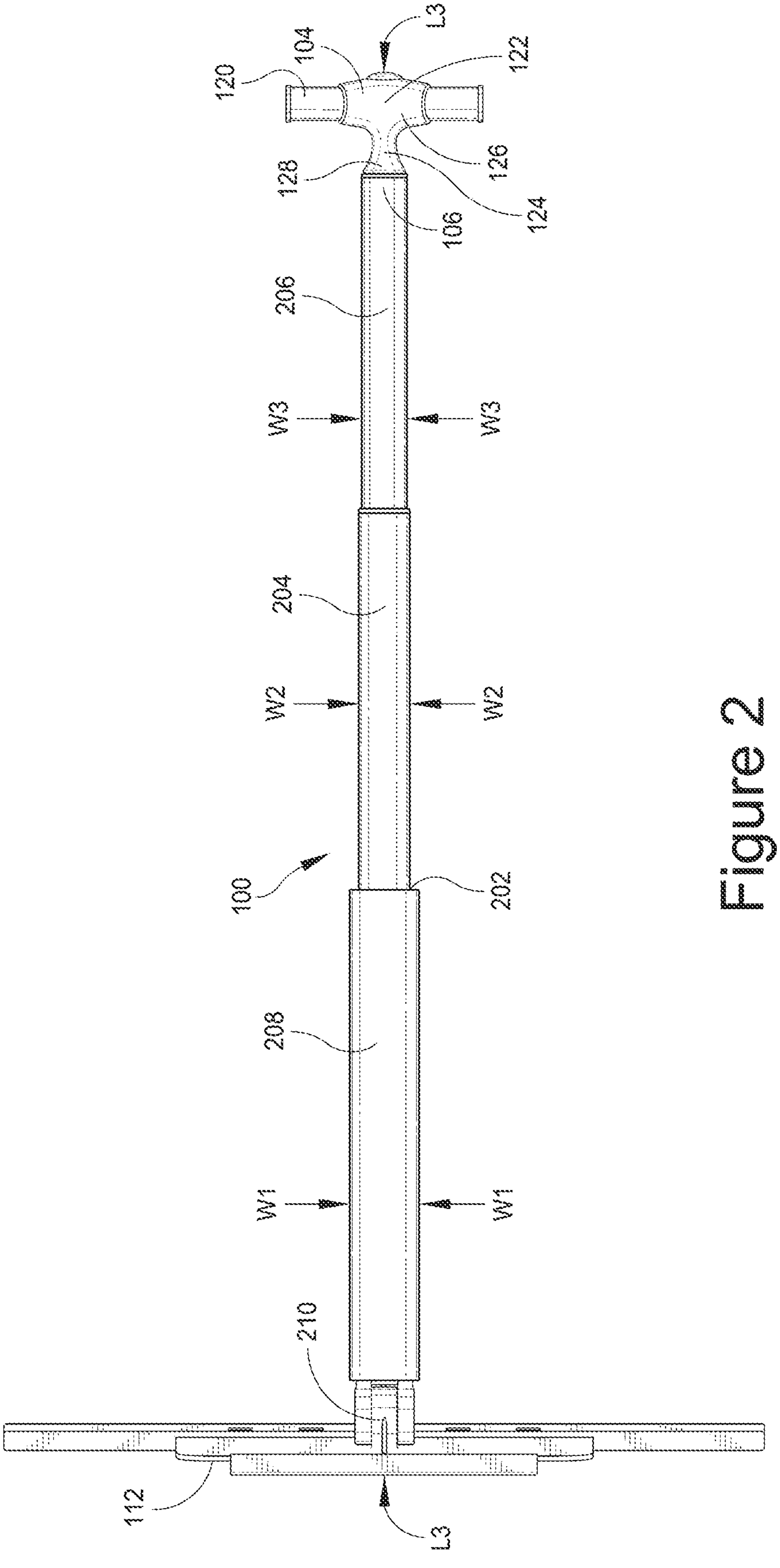
FIG. 2 is a plan view of a variant the snow paddle and ice scraper of FIG. 1.

With reference now to FIG. 2, the handle grip 104 has a central laterally extending tubular section 120 mounted within a T-shaped rigid plastic grip/mount 122. An I-component 124 of the T-shaped mount 122 is narrowed with respect to its transverse component 126 surrounding the central tubular section 120. The lower end 128 of the I-component 124 is securely mounted within, and penetrates, the telescoping handle's narrow end 106.

Figure 3:
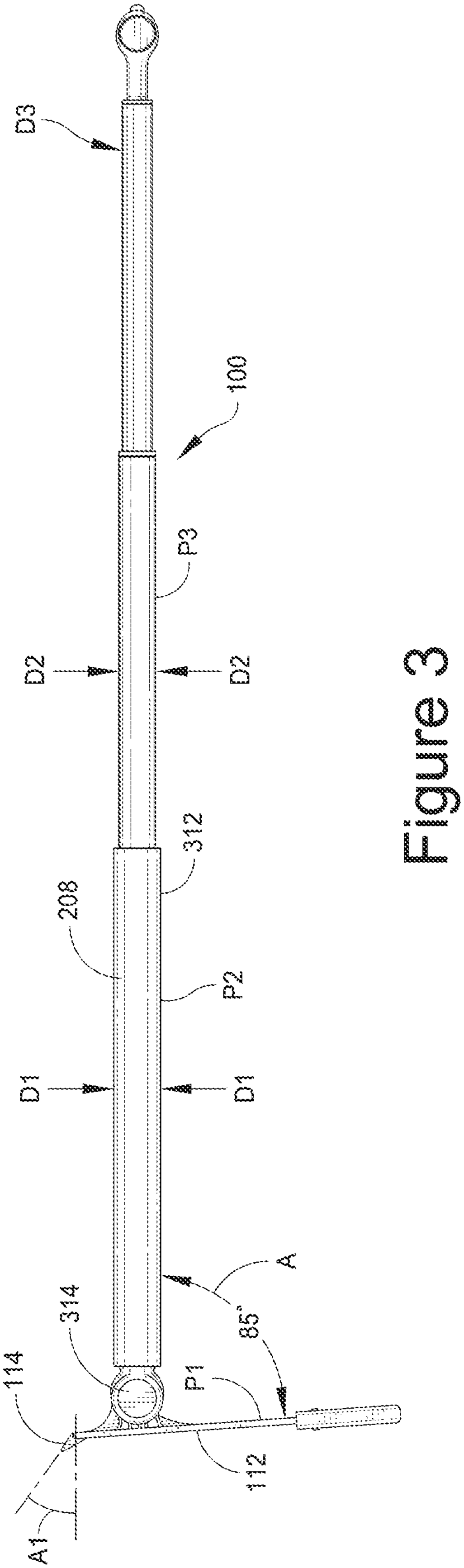
FIG. 3 is an elevational view of the snow paddle and ice scraper of FIG. 2.
Figure 12:
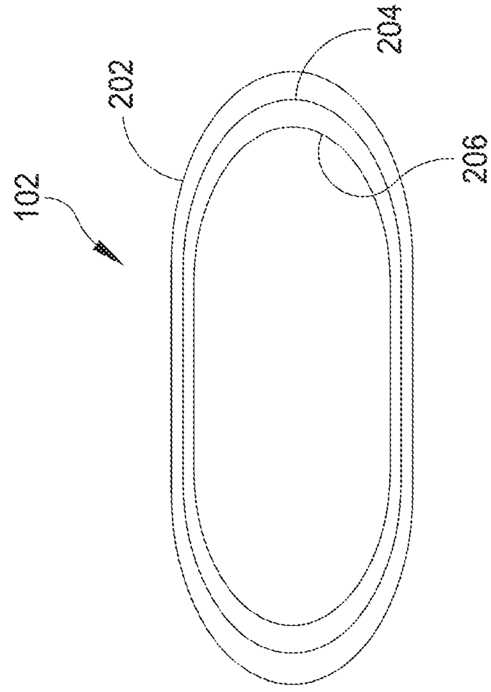
FIG. 12 is a section view of an embodiment of the handle taken along the line X-X in FIG. 7.

With reference now to FIGS. 2, 3, and 12, in some embodiments the three telescoping handle tubes 202, 204, and 206 have an oblong, tubular cross-section and an oblong, tubular, flexible, compressible, resilient foam grip 208 surrounds the widest handle tube 202 adjacent a rotatable paddle mount 210 to which the paddle 112 is mounted. The widths W1-W1, W2-W2, and W3-W3 of the three telescoping handle sections 202, 204, and 206, respectively, are substantially greater than their respective depths D1-D1, D2-D2, and D3-D3. In one embodiment, the widths and depths are as follows: W1-W1, W2-W2, and W3-W3 are 1.87, 1.57, and 1.375 inches, respectively, and D1-D1, D2-D2, and D3-D3 are 1.10, 0.90, and 0.70 inches, respectively; and the thickness of the foam grip 208 is 0.17 inches. The tubular walls of the telescoping handle sections 202, 204, 206 are approximately 0.31 inches thick.

The telescoping handle 102 could have more than 3 telescoping sections to provide, for example, greater reach in some applications; or the telescoping handle could have fewer than three sections. The handle could be other than tubular in cross-section, such as square, for example. The handle sections may all be of the same length, or they may be of differing lengths as desired. In some embodiments, the handle 102 may consist of only one section.

Figure 8:
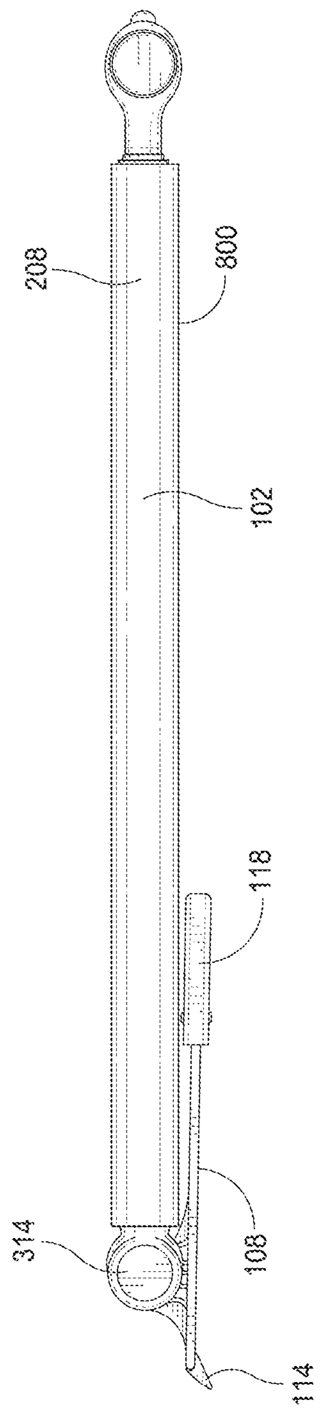
FIG. 8 is an elevational view of the fully collapsed snow paddle and ice scraper of FIG. 7.
Figure 9:
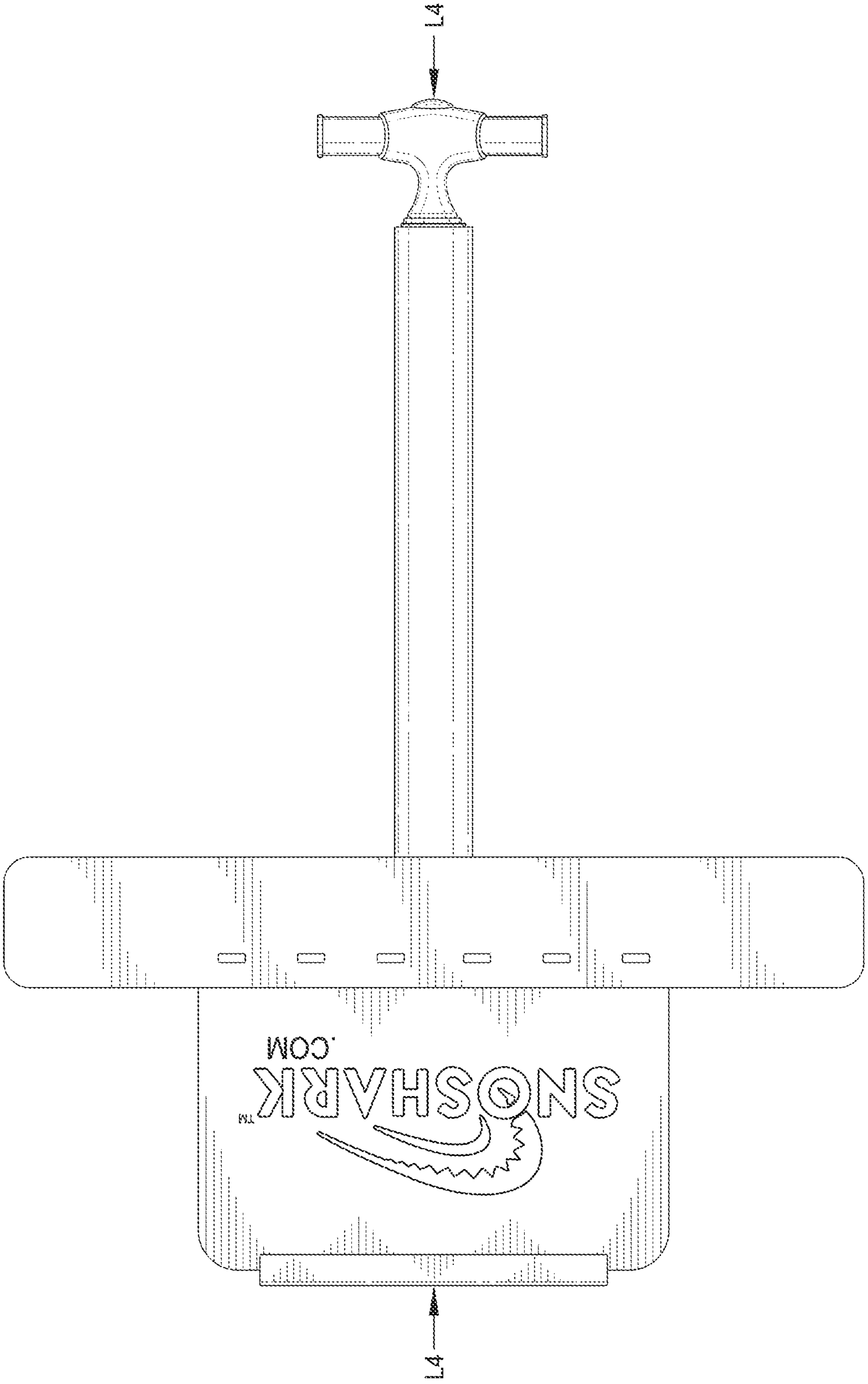
FIG. 9 is a bottom view of the fully collapsed snow paddle and ice scraper of FIG. 7.

Referring now to FIG. 3, when the snow paddle 100 is in the fully opened position, a plane P1 of the paddle 112 is parallel to the axis of the handle grip 104 and defines an angle A of about 86 degrees to a plane P2 of a lowermost side 312 of the foam grip 208. The scraper edge 114 extends from the central paddle 112 at an angle A1 of approximately 45 degrees from the plane P1 of the paddle 112. This angle A1 could vary from 0 degrees to 170 degrees; and angle A may also vary by up to about plus or minus 30 degrees. As shown in FIG. 8, the scraper edge 114 may have a generally triangular cross-section with a somewhat rounded scraping edge 115 on its distal end 115 opposite its wider end 117 integrally formed on, or otherwise secured to, the central paddle 112.

Figure 4:
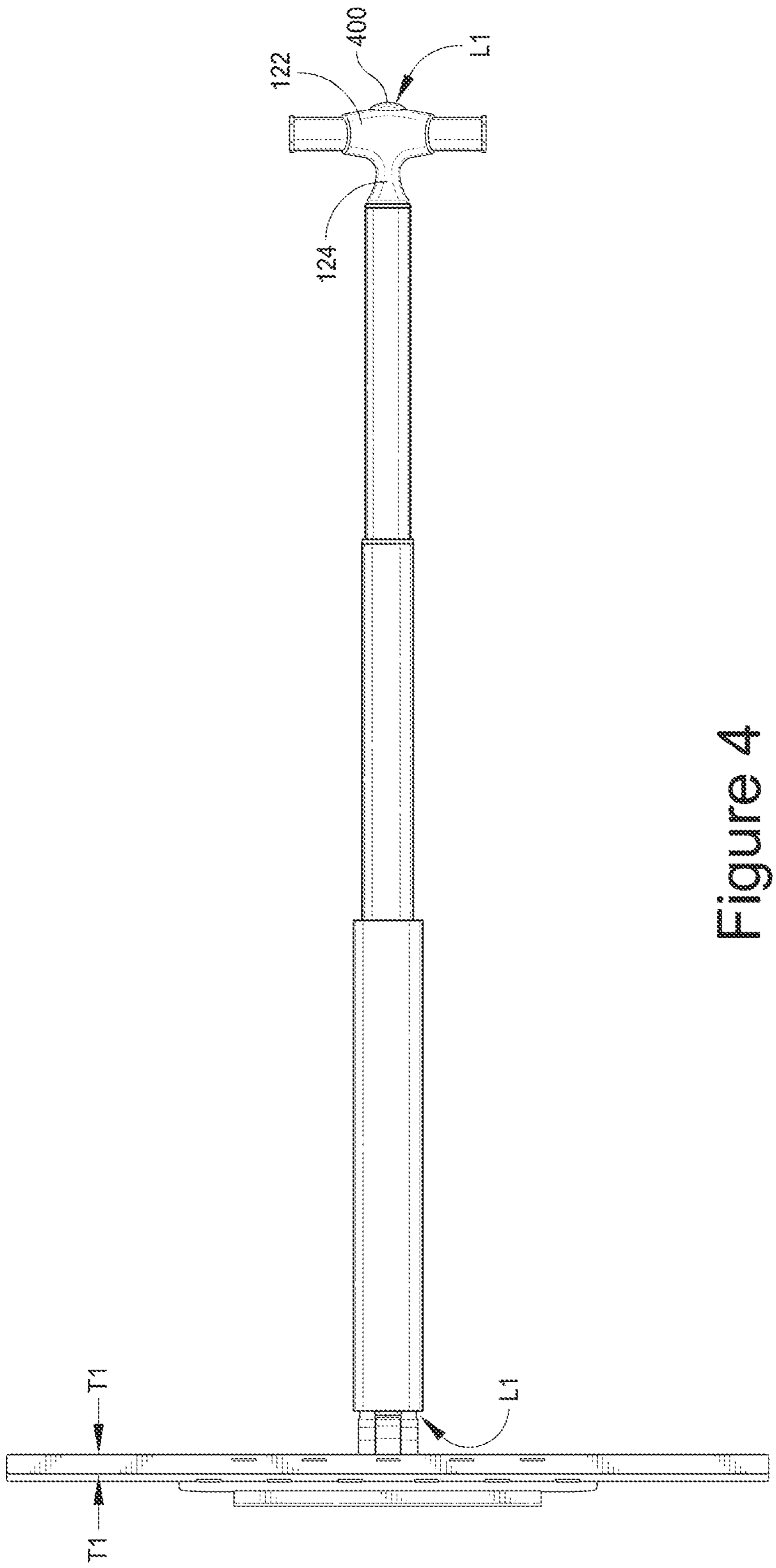
FIG. 4 is a bottom view of the snow paddle and ice scraper of FIG. 2.
Figure 7:
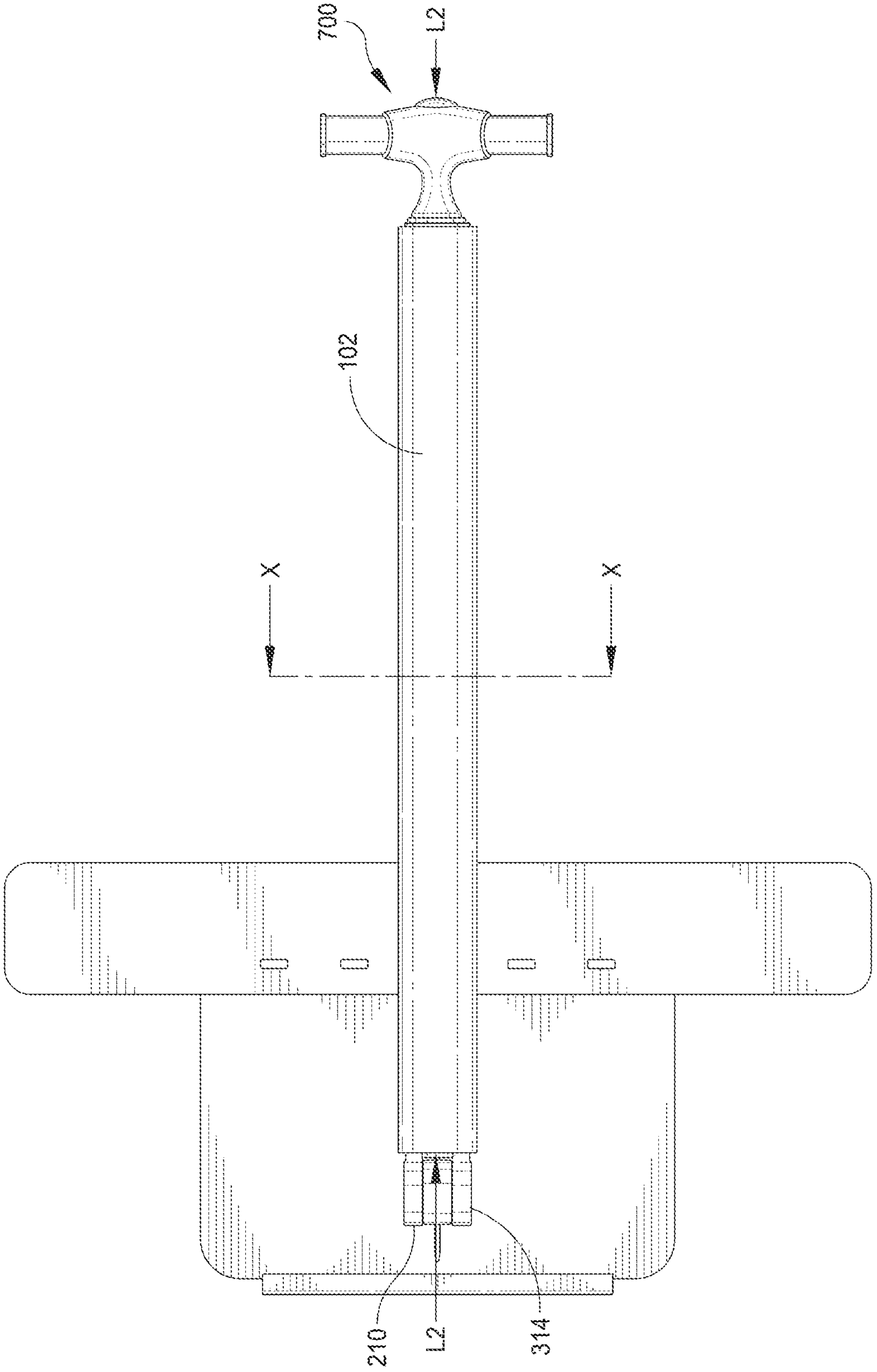
FIG. 7 is a plan view of the snow paddle and ice scraper of FIG. 2 in its fully collapsed position.

With reference to FIG. 4, the lateral length of the fully-extendable telescoping handle L1-L1 is about 54 inches. A spring biased, handle collapsing button 400 extends laterally outwardly coaxial with the central axis of the I-component 124 of the T-shaped grip/mount 122. Pressing this button 400 and pushing of the handle grip 104 causes internal collapsing structure (not shown) to fully collapse the telescoping handle 102 so that, as shown in FIG. 7, the length L2-L2 of the telescoping handle is shortened to 22.0 inches. The internal collapsing structure is of the same type used to collapse telescoping luggage handles.

With reference back to FIG. 2, the overall lateral length of the fully extended and opened snow paddle L3-L3 is about 54.25 inches. With contrasting reference to FIG. 1, the overall lateral length of the fully collapsed and closed snow paddle L4-L4 is 25.375 inches.

Figure 5:
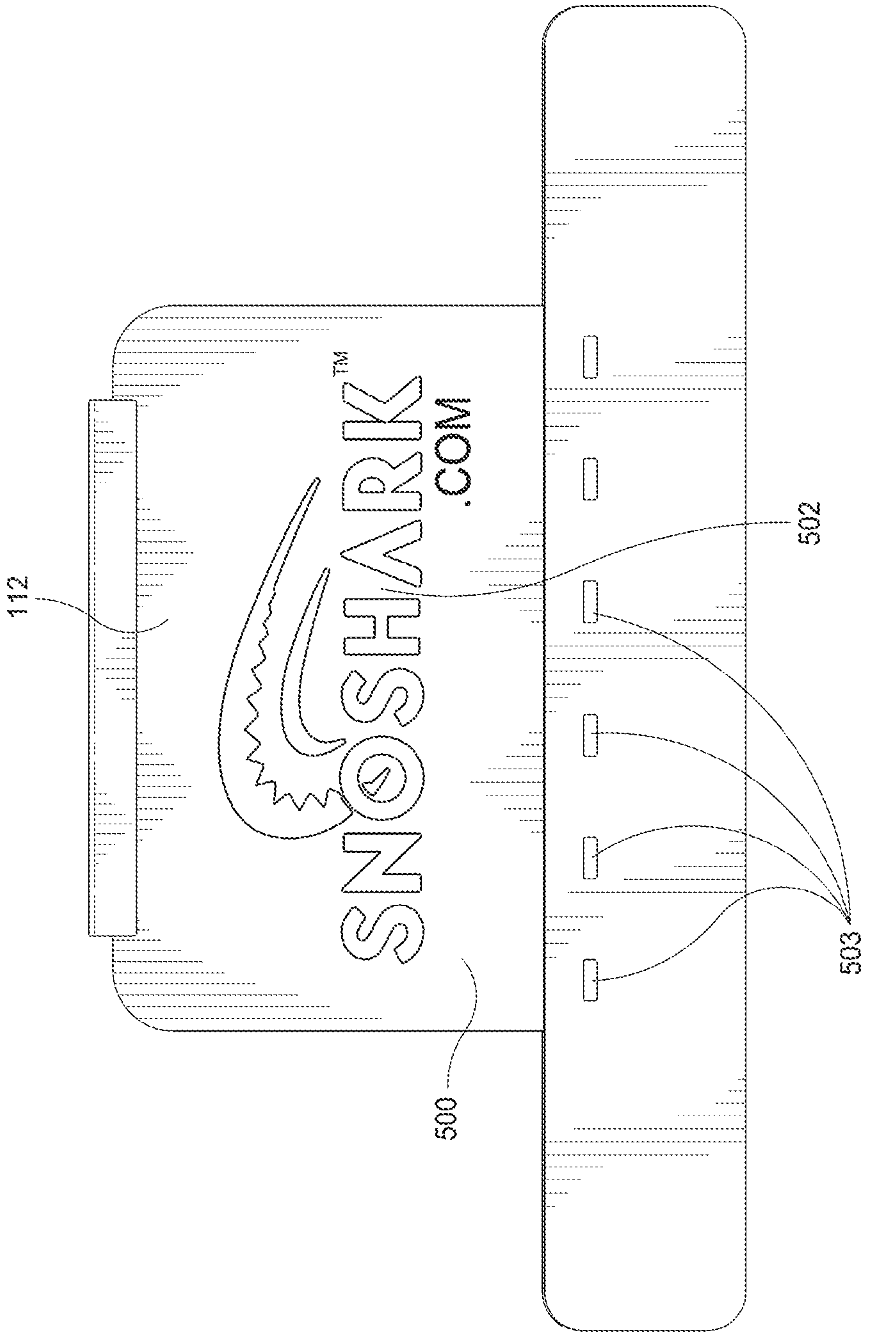
FIG. 5 is a side view of the paddle end of the snow paddle and ice scraper of FIG. 2.

Referring now to FIG. 5, the outer surface 500 of the central paddle 112 can include indicia 502 such as trade identity information, for example. The indicia 502 may be formed on the central paddle 112 in any suitable way, such as, for example, by painting on, or laser cutting into, the outer surface 500. The edge cap may have apertures configured to receive one or more tabs 503 of the central paddle 112, for example, to securely mount the edge cap to the central paddle 112. The central paddle 112 may also have rounded peripheral corners to prevent damaging a surface (including human skin) with which they may come into contact during use or when stored or other non-use.

Figure 6:
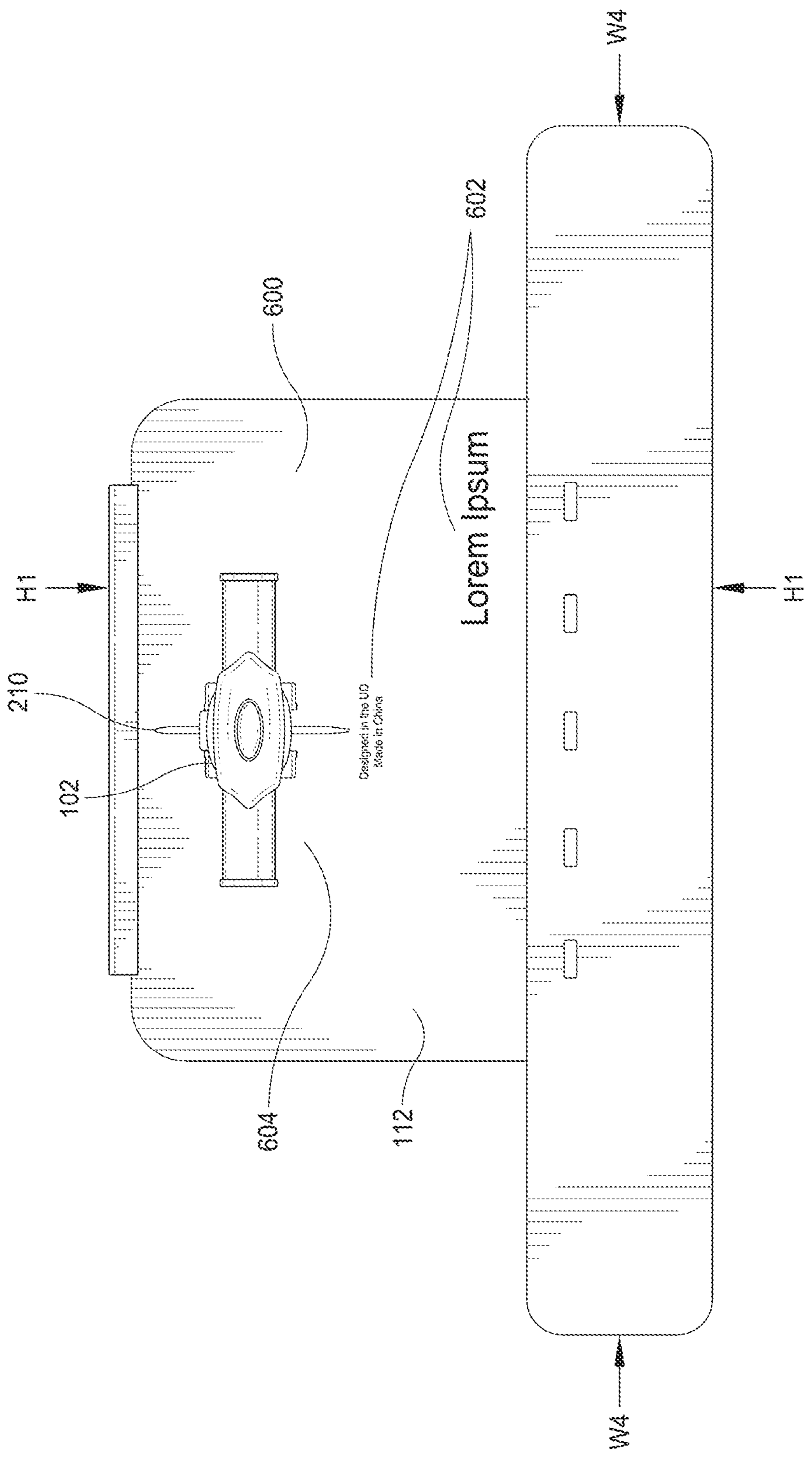
FIG. 6 is a side view of the handle end of the snow paddle and ice scraper of FIG. 2.

Referring now to FIG. 6, the inner surface 600 of the central paddle 112 can also include indicia 602 formed in any suitable way. The paddle mount 210 can be mounted closer to the scraper edge 114 than the lower edge 116 surrounded by the edge cap 118, providing a substantially larger paddle surface area 604 below the paddle mount 210, and the telescoping handle 102 extending from the paddle mount 210. The paddle's inner surface 600 can therefore be used to pull material, such as snow, off of a surface; and, with contrasting reference to FIG. 5, the paddle's outer surface 500 can be used to push material off of a surface.

The paddle's height H1-H1 can be about 8.5 to 9 inches, and its width W4-W4 can be about 11 inches. The thickness of the edge cap material can be approximately 0.25 inches. With reference back to FIG. 4, the thickness T1-T1 of the central paddle 112 can be approximately 3/16th of an inch, for example.

With reference to FIGS. 3, 4, and 7, by collapsing the telescoping handle 102 as described above and then pressing and depressing a spring-biased paddle rotation button 314 within a tubular button housing 316 with its axis extending (i) transverse to the axis of the handle 102 within the paddle mount 210 and (ii) parallel to the axis of the handle grip 104, the snow shovel 700 fully collapses to a collapsed position as shown in FIGS. 7-11. With reference to FIG. 8, in the fully collapsed position, the snow paddle/scraper 108 has been rotated and locked so that the edge cap 118 securely abuts the lowermost underside 800 of the foam grip 208 and the collapsed telescoping handle 102 is securely locked in the collapsed state.

In one embodiment, the edge cap has a thickness ET of ½ inch, a height EH of 3.06 inches, a weight of 146 grams, and a durometer shore 00 rating of 30 to 80, for example 65; and the snow removal paddle 112 has a durometer shore A rating of from 55-100, for example 80. The edge cap 118 also has a width EW of 19 inches. As shown in FIG. 1, the width EW is substantially longer than the width W4 of the central paddle 112, which can be about 10.875 inches, such that the edge cap 118 is capable of removing more snow than edge caps that have a width that is substantially the same as the central paddle 112. The increased width EW of the edge caps 118 described herein enable a user to remove a greater volume of snow with each swipe as compared to edge caps that have a width that is substantially the same as the central paddle 112 thereby speeding up the snow removal process, decreasing the amount of time the user is exposed to the elements, and ultimately increasing user comfort. In some embodiments, the width EW of the edge cap 118 is 10%, 20%, 30%, 40%, 50%, 60%, 70%, 90%, 100%, 110%, 120%, 130%, 140%, 150%, 160%, 170%, 180%, 190%, 200%, and/or greater than 100% longer than the width W4 of the central paddle 112.

In the fully collapsed position, the scraper edge 114 of the snow paddle 100 can be used as an ice scraper. Alternatively, when in the fully collapsed position, pressing the paddle rotation button 314 can allow the user to rotate the paddle/scraper to its fully extended and opened position and use this arrangement of the snow paddle either as a shortened snow-removal paddle or snow or ice scraper.

Figure 10:
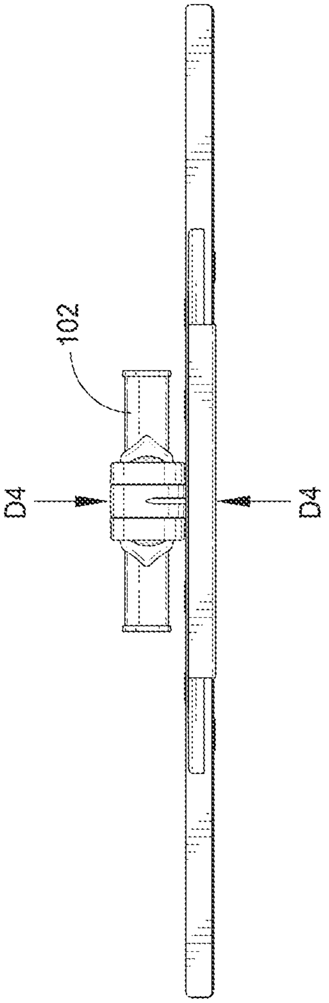
FIG. 10 is a side view of the paddle end of the fully collapsed snow paddle and ice scraper of FIG. 7.
Figure 11:
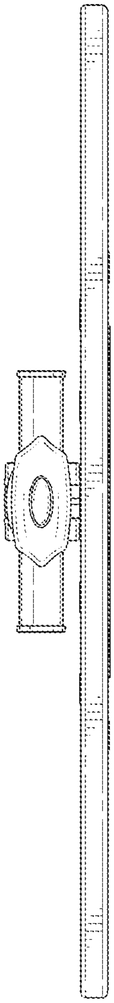
FIG. 11 is a side view of the handle end of the fully collapsed snow paddle and ice scraper of FIG. 7.

With reference now to FIG. 10, the depth D4-D4 of the collapsed snow paddle 102 is approximately 2.375 inches. The relatively small volume and size of this embodiment of the collapsed snow paddle 102 frequently can be stored under a vehicle seat, behind a seat, on a vehicle floor, or in a utility container or drawer such as on the back of a truck.

Figure 13:
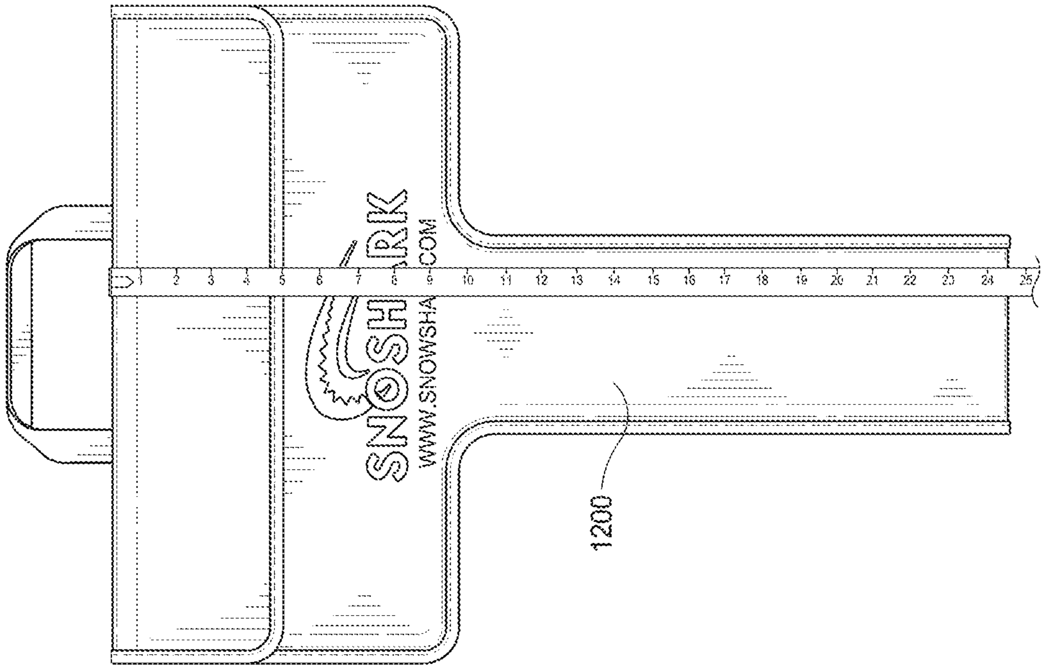
FIG. 13 is a plan view of a snow-paddle bag in which the collapsed snow paddle can be easily inserted through a top end of the bag, also having a handle, and then stored and transported.
Figure 14:
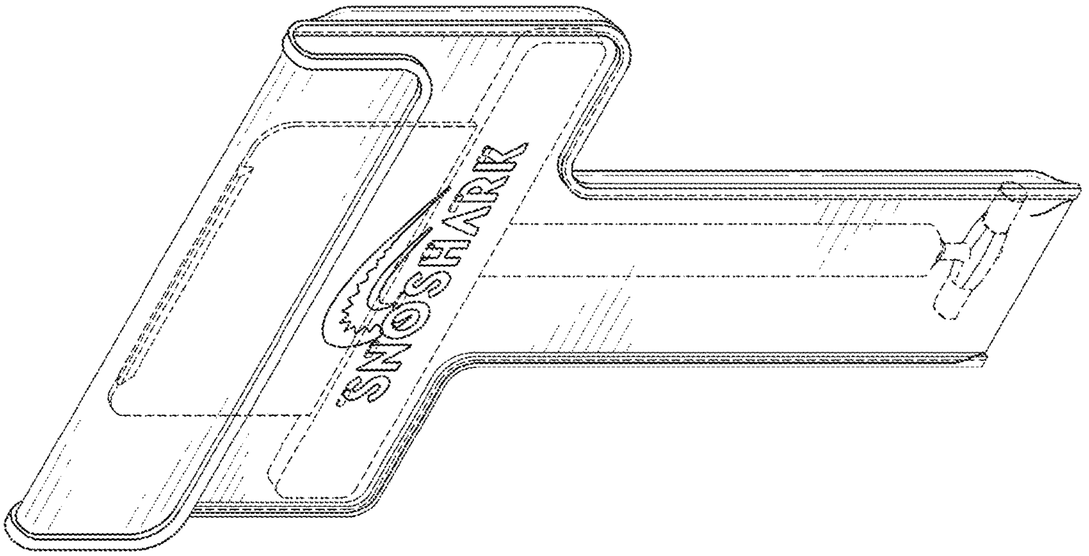
FIG. 14 is an isometric view of the snow paddle bag of FIG. 13, in which the bag is semi-transparent to depict the snow paddle inserted in the closed bag.
Figure 15:
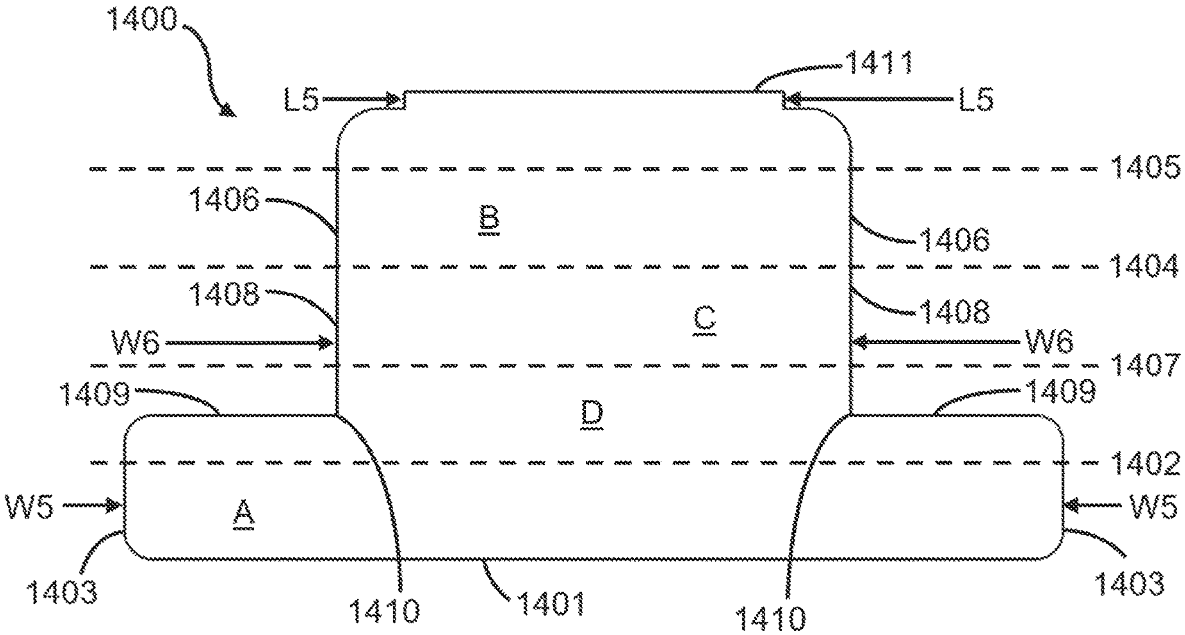
FIG. 15 is a profile of an edge cap that is mounted to a paddle.

With reference now to FIGS. 13 & 14, the snow paddle when collapsed can be attractively stored in a T-shaped snow paddle bag as shown in FIGS. 13 & 14. The maximum width of the bag at the upper end of the T-shape can be 21 inches. The maximum height of the bag can be 32.25 inches. This bag size can easily be stored, with the snow paddle stored entirely within the bag, behind truck seats in a truck for example. The external periphery of the snow paddle bag can also include indicia, such as trademark(s), web site url, and other information as desired.

With reference back to FIGS. 1-9, the following components may be made with the following materials:

- telescoping tubes 202, 204, 206: metal such as aluminum;
- central paddle 112: resilient, relatively rigid plastic, such as HDPE, nylon, or polypropylene;
- scraper edge 114: relatively more rigid plastic as compared to that of the central paddle, such as HDPE, nylon, or polypropylene;
- edge cap 118: relatively soft and stretchable plastic such as EVA or polyethylene;
- rotation button 314: a rigid plastic, such as HDPE, nylon, or polypropylene;
- tubular button housing: zinc alloy;
- paddle mount 210: a rigid plastic, such as HDPE, nylon, or polypropylene;
- handle grip tubular section 120: 0.2 inch thick aluminum;
- T-shaped mount 122: rigid plastic, such as HDPE, nylon, or polypropylene;
- snow paddle bag: any suitable fabric, such as polyester or polypropylene; and
- foam grip 208: plastic foam, such as molded polyethylene foam or PP/TPE or EVA.

One of more of the plastic components above may also include anti-freeze mixed within it or coated on the outer surface. In one embodiment, at least the foam grip 208, paddle mount 210, and T-shaped mount include such anti-freeze. In some embodiments, the edge cap includes an anti-freeze additive.

The entire collapsed snow paddle of FIGS. 7-11 weighs approximately 1.5 to 3 lbs. In the depicted embodiment it may weigh about 2.1 lb. The snow paddle bag of FIG. 13 weighs about 14 ounces. The collapsed snow paddle and bag are thus not only compact but also light weight and economical to ship, store, and transport.

An alternative embodiment of the snow paddle (not shown) may be substantially larger than the snow paddle of FIGS. 1-11. For example, such a snow paddle may weigh 3.5 lbs. and have a fully extended length, from snow paddle to the opposed handle, of 84 inches and a fully collapsed length, of 34 inches.

With reference to FIG. 14, the snow paddle with the substantially wider edge cap has a profile that speeds up the snow removal process, decreasing the amount of time the user is exposed to the elements, and ultimately increasing user comfort. FIG. 14 depicts a profile 1400, which is a projection of an edge cap and a snow removal paddle into a 2-dimensional plane when the edge cap is mounted to the snow removal paddle. The profile 1400 comprises a boundary (continuous solid line) that circumscribes the profile 1400. The profile 1400 comprises a lower surface projection 1401 of a lower surface of the edge cap into the 2-dimensional plane.

The profile 1400 has a distal surface A, which is bounded by (1) the lower surface projection 1401, (2) a distal line 1402 (dashed line) that is both parallel to and 5 centimeters from the lower surface projection 1401, and (3) two segments 1403 of the boundary that extend from the lower surface projection 1401 to intersect the distal line 1402. In some embodiments, the distal surface A has a distal surface area of at least 200 square centimeters and up to 300 square centimeters. In some very specific embodiments, the distal surface area is at least 230 square centimeters and up to 250 square centimeters. FIG. 14 depicts a distal surface A with a convex shape, in which the two segments 1403 each comprise a rounded, convex corner. Rounded corners inhibit the edge cap from damaging surfaces of vehicles (and human skin).

The profile 1400 has a proximal surface B, which is bounded by (1) an intermediate line 1404 (dashed line) that is both parallel to and 15 centimeters from the lower surface projection 1401, (2) a proximal line 1405 (dashed line) that is both parallel to and 20 centimeters from the lower surface projection 1401, and (3) two segments 1406 of the boundary that intersect the intermediate line 1404 and the proximal line 1405. In some embodiments, the proximal surface B has a proximal surface area of at least 100 square centimeters and up to 175 square centimeters. In some very specific embodiments, the proximal surface area is at least 130 square centimeters and up to 150 square centimeters. FIG. 14 depicts a proximal surface B with a rectangular shape.

The profile 1400 has an intermediate surface C, which is bounded by (1) the intermediate line 1404, (2) a second intermediate line 1407 (dashed line) that is both parallel to and 10 centimeters from the lower surface projection 1401, and (3) two segments 1408 of the boundary that intersect the intermediate line 1404 and the second intermediate line 1407. In some embodiments, the intermediate surface has an intermediate surface area of at least 100 square centimeters and up to 175 square centimeters. In some very specific embodiments, the second intermediate surface area is at least 130 square centimeters and up to 150 square centimeters. FIG. 14 depicts an intermediate surface C with a rectangular shape.

The profile 1400 has a second intermediate surface D, which is bounded by (1) the distal line 1402, (2) the second intermediate line 1407, and (3) two segments 1409 of the boundary that intersect the intermediate line and the second intermediate line. The second intermediate surface D has a concave shape. The two segments 1409 of the boundary that intersect the distal line 1402 and the second intermediate line 1407 each comprise an angled, concave corner 1410. Each angled, concave corner 1410 is defined by a point at which an upper surface projection of the edge cap meets a side surface projection of the snow remove paddle. The two segments of the boundary that intersect the distal line 1402 and the second intermediate line 1407 each also comprise a rounded, convex corner. Rounded corners inhibit the edge cap from damaging surfaces of vehicles.

The distal surface A, proximal surface B, intermediate surface C, and second intermediate surface D make up a lower paddle surface. In some embodiments, the lower paddle surface has a surface area of at least 600 square centimeters and up to 800 square centimeters. In some very specific embodiments, the lower paddle surface has a surface area of at least 620 square centimeters and up to 680 square centimeters.

The profile 1400 has an arm width W5-W5, which is a maximum distance measured parallel to the lower surface projection 1401 and between the two segments 1403 of the boundary that extend from the lower surface projection 1401 to intersect the distal line 1402. In some embodiments, the arm width is at least 35 centimeters and up to 70 centimeters. In some very specific embodiments, the arm width is at least 40 centimeters and up to 60 centimeters.

The profile 1400 has a neck width W6-W6, which is a minimum distance measured parallel to the lower surface projection 1401 and between two segments (1403+1409+1408) of the boundary that extend from the lower surface projection 1401 to intersect the intermediate line 1404. In some embodiments, the neck width is at least 10 centimeters and up to 30 centimeters. In some very specific embodiments, the neck width is at least 25 centimeters and up to 30 centimeters.

A scraper edge projection 1411 of the scraper edge into the 2-dimensional plane forms a portion of the boundary of the profile 1400. The scraper edge projection 1411 has a length L5-L5 that is measured parallel to the lower surface projection 1401. In some embodiments, the arm width W5-W5 is at least 2.0 times the length L5-L5 of the scraper edge projection 1411.

One method of use of the snow paddle and bag is as follows:

remove the snow paddle from its place of storage and bag;

if desired, replace the edge cap with a different edge cap of different size and/or shape;

extend the telescopic handle if desired;

press the paddle rotation to rotate the paddle to the extended and fully open position;

if desired, hold the foam grip with one or two hands to scrape ice on a surface with the scraper edge;

if desired, grasp the handle grip with one hand and the telescoping handle with the other hand and insert opened paddle into snow on a surface and push or pull the telescoping handle and paddle to push snow away or pull it off the surface (note that the depicted size of the rigid paddle can push or pull relatively large quantities of snow; larger paddles can push or pull yet larger quantities; also note that the paddle scraper edge can be inserted into snow to both scrape with the scraper edge and remove push or pull snow at the same time);

fully collapse and close the snow paddle; and place the snow paddle in its storage bag and store the paddle and bag as desired.

Yet other variations for use of the snow paddle are set forth above, and they may be mixed and matched with steps set forth in the preceding sentence in this paragraph.

Embodiments of the snow paddle can also be used to: remove debris from vehicles, decks, railings, and other structures; remove snow from the area around a vehicle; and quickly remove snow from tree wells to rescue snow boarders, skiers, etc.

Further, components of the snow paddle may be replaceable. For example, the scraper edge and the edge cap may be sized and formed to be replaceable on the paddle. Similarly, the foam grip may be removable and replaceable on the thickest telescoping tube section.

Various aspects of the disclosure relate to a snow paddle kit. In some embodiments, the snow paddle kit comprises a snow removal paddle. In some embodiments, the snow removal paddle comprises a handle. A handle is typically mountable to the snow removal paddle. A handle may optionally be removably mountable to the snow removal paddle. In some embodiments, the snow removal paddle comprises an edge cap. An edge cap is typically mountable to the snow removal paddle such as removably mountable to the snow removal paddle. In some embodiments, the edge cap is mountable to a lower edge of the snow removal paddle such as removably mountable to the lower edge of the snow removal paddle.

In some embodiments, the edge cap has a width, which is the longest dimension of the edge cap; the lower edge of the snow removal paddle has a width, which is the longest dimension of the lower edge; and the width of the edge cap is substantially wider than the width of the lower edge of the snow removal paddle.

In some embodiments, "substantially wider" refers to a width that is at least 10 centimeters more than another width.

In some embodiments, "substantially wider" refers to a width that is at least 20 percent more than another width.

In some embodiments, the width of the edge cap is at least 10 centimeters wider than the width of the lower edge of the snow removal paddle. In some specific embodiments, the width of the edge cap is at least 15 centimeters wider than the width of the lower edge of the snow removal paddle. In some very specific embodiments, the width of the edge cap is at least 15 centimeters wider and up to 30 centimeters wider than the width of the lower edge of the snow removal paddle.

In some embodiments, the width of the edge cap is at least 30 percent wider than the width of the lower edge of the snow removal paddle. In some specific embodiments, the width of the edge cap is at least 50 percent wider than the width of the lower edge of the snow removal paddle. In some very specific embodiments, the width of the edge cap is at least 50 percent wider and up to 100 percent wider than the width of the lower edge of the snow removal paddle.

In some embodiments, the edge cap has a durometer shore 00 rating of at least 30 and up to 80.

In some embodiments, the edge cap is softer than the snow removal paddle as assessed on a durometer shore hardness scale.

In some embodiments, the edge cap has a mass of at least 100 grams. In some specific embodiments, the edge cap has a mass of at least 100 grams and up to 200 grams. In some very specific embodiments, the edge cap has a mass of at least 120 grams and up to 180 grams.

In some embodiments, the snow removal paddle has a snow-facing surface when the edge cap is not mounted on the snow removal paddle; the snow-facing surface of the snow removal paddle has a first surface area; the snow paddle kit has a snow-facing surface when the edge cap is mounted on the snow removal paddle; the snow-facing surface of the snow paddle kit has a second surface area; and the second surface area is at least 80 square centimeters greater than the first surface area. In some specific embodiments, the second surface area is at least 100 square centimeters greater than the first surface area. In some very specific embodiments, the second surface area is at least 100 square centimeters and up to 200 square centimeters greater than the first surface area. The edge cap can thereby extend the surface area of the snow paddle kit beyond the surface area of the snow removal paddle, and differently sized and shaped edge caps can extend the surface area to different extents for different purposes. Smaller sizes are often more convenient for storage, for example, and larger sizes are generally more effective at removing snow from vehicles.

In some embodiments, the snow removal paddle has a snow-facing surface; the snow removal paddle comprises at least two tabs that extend from the snow-facing surface; the edge cap has a face that comprises at least two apertures; and when the edge cap is mounted to the snow removal paddle, then the at least two apertures of the edge cap receive the at least two tabs of the snow-facing surface. In some specific embodiments, the at least two apertures of the edge cap receive the at least two tabs of the snow-facing surface to secure the edge cap to the snow removal paddle.

In some embodiments, the snow removal paddle has a back; the back comprises at least two tabs that extend from the snow-facing surface; the edge cap has a face that comprises at least two apertures; and when the edge cap is mounted to the snow removal paddle, then the at least two apertures of the edge cap receive the at least two tabs of the back of the snow removal paddle. In some specific embodiments, the at least two apertures of the edge cap receive the at least two tabs of the back of the snow removal paddle to secure the edge cap to the snow removal paddle.

In some embodiments, the snow removal paddle has a snow-facing surface; the snow removal paddle comprises at least two tabs that extend from the snow-facing surface; the snow removal paddle has a back opposite the snow facing surface; the back comprises at least two tabs that extend from the snow-facing surface; the edge cap has two faces that are opposite each other and that each comprise at least two apertures; and when the edge cap is mounted to the snow removal paddle, then (1) the at least two apertures of one face of the edge cap receive the at least two tabs of the snow-facing surface, and (2) the at least two apertures of the other face of the edge cap receive the at least two tabs of the back of the snow removal paddle. In some specific embodiments, (1) the at least two apertures of one face of the edge cap receive the at least two tabs of the snow-facing surface, and (2) the at least two apertures of the other face of the edge cap receive the at least two tabs of the back of the snow removal paddle to secure the edge cap to the snow removal paddle. In some specific embodiments, the snow-facing surface of the snow removal paddle and the back of the snow removal paddle each comprise a different number of tabs; the two faces of the edge cap each comprise a different number of apertures; the snow-facing surface of the snow removal paddle and one face of the edge cap each comprise the same number of tabs as apertures; the back surface of the snow removal paddle and the other face of the edge cap each comprise the same number of tabs as apertures; and the difference in tabs and apertures orients the edge cap relative to the snow removal paddle.

FIG. 14 depicts a profile 1400, which is a projection of an edge cap and a snow removal paddle into a 2-dimensional plane when the edge cap is mounted to the snow removal paddle. The profile 1400 comprises a boundary (continuous solid line) that circumscribes the profile 1400. The profile 1400 comprises a lower surface projection 1401 of a lower surface of the edge cap into the 2-dimensional plane.

The profile 1400 has a distal surface A, which is bounded by (1) the lower surface projection 1401, (2) a distal line 1402 (dashed line) that is both parallel to and 5 centimeters from the lower surface projection 1401, and (3) two segments 1403 of the boundary that extend from the lower surface projection 1401 to intersect the distal line 1402. In some embodiments, the distal surface A has a distal surface area of at least 200 square centimeters and up to 300 square centimeters. FIG. 14 depicts a distal surface A with a convex shape, in which the two segments 1403 each comprise a rounded, convex corner. Rounded corners inhibit the edge cap from damaging surfaces of vehicles.

The profile 1400 has a proximal surface B, which is bounded by (1) an intermediate line 1404 (dashed line) that is both parallel to and 15 centimeters from the lower surface projection 1401, (2) a proximal line 1405 (dashed line) that is both parallel to and 20 centimeters from the lower surface projection 1401, and (3) two segments 1406 of the boundary that intersect the intermediate line 1404 and the proximal line 1405. In some embodiments, the proximal surface B has a proximal surface area of at least 100 square centimeters and up to 175 square centimeters. FIG. 14 depicts a proximal surface B with a rectangular shape.

The profile 1400 has an intermediate surface C, which is bounded by (1) the intermediate line 1404, (2) a second intermediate line 1407 (dashed line) that is both parallel to and 10 centimeters from the lower surface projection 1401, and (3) two segments 1408 of the boundary that intersect the intermediate line 1404 and the second intermediate line 1407. In some embodiments, the intermediate surface has an intermediate surface area of at least 100 square centimeters and up to 175 square centimeters. FIG. 14 depicts an intermediate surface C with a rectangular shape.

The profile 1400 has a second intermediate surface D, which is bounded by (1) the distal line 1402, (2) the second intermediate line 1407, and (3) two segments 1409 of the boundary that intersect the intermediate line and the second intermediate line. The second intermediate surface D has a concave shape. The two segments 1409 of the boundary that intersect the distal line 1402 and the second intermediate line 1407 each comprise an angled, concave corner 1410. Each angled, concave corner 1410 is defined by a point at which an upper surface projection of the edge cap meets a side surface projection of the snow remove paddle. The two segments of the boundary that intersect the distal line 1402 and the second intermediate line 1407 each also comprise a rounded, convex corner. Rounded corners inhibit the edge cap from damaging surfaces of vehicles.

The distal surface A, proximal surface B, intermediate surface C, and second intermediate surface D make up a lower paddle surface. In some embodiments, the lower paddle surface has a surface area of at least 600 square centimeters and up to 800 square centimeters.

The profile 1400 has arm width W5-W5, which is a maximum distance measured parallel to the lower surface projection 1401 and between the two segments 1403 of the boundary that extend from the lower surface projection 1401 to intersect the distal line 1402. In some embodiments, the arm width is at least 35 centimeters and up to 70 centimeters.

The profile 1400 has a neck width W6-W6, which is a minimum distance measured parallel to the lower surface projection 1401 and between two segments (1403+1409+1408) of the boundary that extend from the lower surface projection 1401 to intersect the intermediate line 1404. In some embodiments, the neck width is at least 10 centimeters and up to 30 centimeters.

A scraper edge projection 1411 of the scraper edge into the 2-dimensional plane forms a portion of the boundary of the profile 1400. The scraper edge projection 1411 has a length L5-L5 that is measured parallel to the lower surface projection 1401. In some embodiments, the arm width W5-W5 is at least 2.0 times the length L5-L5 of the scraper edge projection 1411.

In some embodiments, the edge cap and the snow removal paddle have a profile, which is a projection of the edge cap and the snow removal paddle into a 2-dimensional plane when the edge cap is mounted to the snow removal paddle; and the profile comprises a boundary that circumscribes the profile.

In some embodiments, the edge cap has a lower surface configured to contact a vehicle, and a lower surface projection of the lower surface of the edge cap into the 2-dimensional plane forms a portion of the boundary of the profile.

In some embodiments, the profile has a distal surface, which is bounded by (1) the lower surface projection, (2) a distal line that is both parallel to and 5 centimeters from the lower surface projection, and (3) two segments of the boundary that extend from the lower surface projection to intersect the distal line. In some embodiments, the distal surface has a distal surface area of at least 200 square centimeters. In some specific embodiments, the distal surface has a distal surface area of at least 200 square centimeters and up to 300 square centimeters. In some very specific embodiments, the distal surface has a distal surface area of at least 220 square centimeters and up to 300 square centimeters.

In some embodiments, the profile has a proximal surface, which is bounded by (1) an intermediate line that is both parallel to and 15 centimeters from the lower surface projection, (2) a proximal line that is both parallel to and 20 centimeters from the lower surface projection, and (3) two segments of the boundary that intersect the intermediate line and the proximal line. In some embodiments, the proximal surface has a proximal surface area of up to 200 square centimeters. In some specific embodiments, the proximal surface has a proximal surface area of up to 175 square centimeters. In some very specific embodiments, the proximal surface has a proximal surface area of at least 100 square centimeters and up to 175 square centimeters.

In some embodiments, the profile has an intermediate surface, which is bounded by (1) the intermediate line, (2) a second intermediate line that is both parallel to and 10 centimeters from the lower surface projection, and (3) two segments of the boundary that intersect the intermediate line and the second intermediate line. In some embodiments, the intermediate surface has as intermediate surface area of up to 200 square centimeters. In some specific embodiments, the intermediate surface has an intermediate surface area of up to 175 square centimeters. In some very specific embodiments, the intermediate surface has an intermediate surface area of at least 100 square centimeters and up to 175 square centimeters.

In some embodiments, the distal surface has a distal surface area, and the proximal surface has a proximal surface area. In some embodiments, the distal surface has a distal surface area, the proximal surface has a proximal surface area, and the intermediate surface has an intermediate surface area.

In some embodiments, the distal surface area is at least 50 square centimeters greater than the proximal surface area. In some specific embodiments, the distal surface area is at least 70 square centimeters greater than the proximal surface area. In some very specific embodiments, the distal surface area is at least 70 square centimeters and up to 140 square centimeters greater than the proximal surface area.

In some embodiments, the distal surface area is at least 1.5 times the size of the proximal surface area. In some specific embodiments, the distal surface area is at least 1.5 times and up to 1.9 times the size of the proximal surface area.

In some embodiments, the distal surface area is at least 50 square centimeters greater than the intermediate surface area. In some specific embodiments, the distal surface area is at least 70 square centimeters greater than the intermediate surface area. In some very specific embodiments, the distal surface area is at least 70 square centimeters and up to 140 square centimeters greater than the intermediate surface area.

In some embodiments, the distal surface area is at least 1.5 times the size of the intermediate surface area. In some specific embodiments, the distal surface area is at least 1.5 times and up to 1.9 times the size of the intermediate surface area.

In some embodiments, the profile has an arm width, which is a maximum distance measured parallel to the lower surface projection and between the two segments of the boundary that extend from the lower surface projection to intersect the distal line; and the arm width is at least 35 centimeters. In some specific embodiments, the arm width is at least 35 centimeters and up to 70 centimeters. In some very specific embodiments, the arm width is at least 40 centimeters and up to 60 centimeters.

In some embodiments, the edge cap and the snow removal paddle have a profile, which is a projection of the edge cap and the snow removal paddle into a 2-dimensional plane when the edge cap is mounted to the snow removal paddle; the profile comprises a boundary that circumscribes the profile; a lower surface projection of a lower surface of the edge cap into the 2-dimensional plane forms a portion of the boundary of the profile; the profile has a distal surface, which is bounded by (1) the lower surface projection, (2) a distal line that is both parallel to and 5 centimeters from the lower surface projection, and (3) two segments of the boundary that extend from the lower surface projection to intersect the distal line; the profile has a proximal surface, which is bounded by (1) an intermediate line that is both parallel to and 15 centimeters from the lower surface projection, (2) a proximal line that is both parallel to and 20 centimeters from the lower surface projection, and (3) two segments of the boundary that intersect the intermediate line and the proximal line; the distal surface has a distal surface area, and the proximal surface has a proximal surface area; the distal surface area is at least 1.5 times size of the proximal surface area; the profile has an arm width, which is a maximum distance measured parallel to the lower surface projection and between the two segments of the boundary that extend from the lower surface projection to intersect the distal line; and the arm width is at least 35 centimeters. In some specific embodiments, the distal surface area is at least 1.5 times and up to 1.9 times the size of the proximal surface area.

In some embodiments, the profile has a neck width, which is a minimum distance measured parallel to the lower surface projection and between two segments of the boundary that extend from the lower surface projection to intersect the intermediate line; and the neck width is up to 80 percent of the arm width. In some specific embodiments, the neck width is at least 10 centimeters and up to 80 percent of the arm width. In some very specific embodiments, the neck width is at least 10 centimeters and up to 65 percent of the arm width.

In some embodiments, the neck width has a size up to 30 centimeters. In some specific embodiments, the neck width is at least 15 centimeters and up to 30 centimeters.

In some embodiments, the arm width is at least 40 centimeters. In some specific embodiments, the arm width is at least 40 centimeters and up to 70 centimeters.

In some embodiments, the arm width is at least 10 centimeters and up to 35 centimeters greater than the neck width. In some specific embodiments, the arm width is at least 15 centimeters and up to 35 centimeters greater than the neck width.

In some embodiments, the arm width is at least 1.5 times the neck width. In some specific embodiments, the arm width is at least 1.5 times and up to 2.0 times the neck width.

In some embodiments, the distal surface area is at least 200 square centimeters. In some specific embodiments, the distal surface area is at least 200 square centimeters and up to 300 square centimeters.

In some embodiments, the proximal surface area has a surface area up to 175 square centimeters. In some specific embodiments, the proximal surface area is at least 100 square centimeters and up to 175 square centimeters.

In some embodiments, the profile has an intermediate surface, which is bounded by (1) the intermediate line, (2) a second intermediate line that is both parallel to and 10 centimeters from the lower surface projection, and (3) two segments of the boundary that intersect the intermediate line and the second intermediate line; and the intermediate surface has an intermediate surface area of up to 175 square centimeters. In some specific embodiments, the intermediate surface has an intermediate surface area of at least 100 square centimeters and up to 175 square centimeters.

In some embodiments, the profile has a lower paddle surface, which is bounded by the lower surface projection, the proximal line, and two boundary segments that extend from the lower surface projection to intersect the proximal line; and the lower paddle surface has a surface area of at least 300 square centimeters. In some specific embodiments, the lower paddle surface has a surface area of at least 600 square centimeters. In some very specific embodiments, the lower paddle surface has a surface area of at least 600 square centimeters and up to 800 square centimeters.

In some embodiments, the distal surface has a convex shape; and the two segments of the boundary that extend from the lower surface projection to intersect the distal line each comprise a rounded, convex corner.

In some embodiments, the proximal surface is an isosceles trapezoid that is optionally a rectangle.

In some embodiments, the profile has a second intermediate surface, which is bounded by (1) the distal line, (2) a second intermediate line that is both parallel to and 10 centimeters from the lower surface projection, and (3) two segments of the boundary that intersect the intermediate line and the second intermediate line.

In some embodiments, the second intermediate surface has a concave shape.

In some embodiments, the two segments of the boundary that intersect the distal line and the second intermediate line each comprise an angled, concave corner.

In some embodiments, an upper surface projection of an upper surface of the edge cap into the 2-dimensional plane forms a portion of the boundary of the profile; two side surface projections of two side surfaces of the snow removal paddle into the 2-dimensional plane form a portion of the boundary of the profile; and each angled, concave corner is defined by a point at which the upper surface projection of the edge cap meets a side surface projection of the snow remove paddle.

In some embodiments, the two segments of the boundary that intersect the distal line and the second intermediate line each comprise a rounded, convex corner.

In some embodiments, the snow paddle kit comprises a scraper edge. In some specific embodiments, the snow removal paddle comprises the scraper edge.

In some embodiments, a scraper edge projection of the scraper edge into the 2-dimensional plane forms a portion of the boundary of the profile; the scraper edge projection has a length that is measured parallel to the lower surface projection; and the arm width is greater than the length of the scraper edge projection.

In some embodiments, the arm width is at least 2.0 times the length of the scraper edge projection.

In some embodiments, the arm width is at least 10 centimeters greater than the length of the scraper edge projection. In some specific embodiments, the arm width is at least 20 centimeters greater than the length of the scraper edge projection. In some very specific embodiments, the arm width is at least 25 centimeters greater than the length of the scraper edge projection.

In some embodiments, the edge cap has a mass of at least 100 grams. In some specific embodiments, the edge cap has a mass of at least 135 grams. In some very specific embodiments, the edge cap has a mass of at least 135 grams and no greater than 200 grams.

In some embodiments, an upper surface projection of an upper surface of the edge cap into the 2-dimensional plane forms a portion of the boundary of the profile; and the distance between the lower surface projection and the upper surface projection and perpendicular to the both the lower surface projection and the upper surface projection is at least 4 centimeters and up to 10 centimeters.

In some embodiments, the projection has an inverted T shape; an edge cap projection of the edge cap into the 2-dimensional plane forms arms of the inverted T shape; and a snow removal paddle projection of the snow removal paddle into the 2-dimensional plane forms a stalk of the inverted T shape.

In some embodiments, the snow paddle kit comprises at least two edge caps. In some specific embodiments, the at least two edge caps comprise a first edge cap and a second edge cap that have different shapes and/or sizes.

A snow paddle kit may comprise a first edge cap, which is a conventional edge cap sized to snuggly fit a snow removal paddle as described herein, and a second edge cap, which is oversized and generally substantially wider than the width of the lower edge of a snow removal paddle as described herein. The snow paddle kit may be stored, for example, in a compact configuration, in which the first edge cap is mounted on the snow removal paddle and the second, oversized edge cap is stored parallel to the handle. The snow paddle kit may be used with the first edge cap mounted on the snow removal paddle to remove light snow. Under heavy snow conditions, a user may choose to replace the first edge cap with the second, oversized edge cap to improve the efficiency of snow removal.

Various aspects of this disclosure relate to a method of using a snow paddle kit, comprising: providing a snow paddle kit that comprises a snow removal paddle and a first edge cap mounted to a lower edge of the snow removal paddle; removing the first edge cap from the snow removal paddle; and mounting a second edge cap to the snow removal paddle, wherein: the first edge cap has a width, which is the longest dimension of the first edge cap; the second edge cap has a width, which is the longest dimension of the second edge cap; the lower edge of the snow removal paddle has a width, which is the longest dimension of the lower edge; the width of the first edge cap is not substantially wider than the width of the lower edge of the snow removal paddle; and the width of the second edge cap is substantially wider than the width of the lower edge of the snow removal paddle.

In some embodiments, the width of the first edge cap is up to 5 centimeters wider than the width of the lower edge of the snow removal paddle. In some specific embodiments, the width of the first edge cap is up to 4 centimeters wider than the width of the lower edge of the snow removal paddle. In some very specific embodiments, the width of the first edge cap is up to 2 centimeters wider than the width of the lower edge of the snow removal paddle.

In some embodiments, the second edge cap is an edge cap as described anywhere in this patent document.

In some embodiments, the method comprises removing snow from a vehicle prior to removing the first edge cap from the snow removal paddle.

In some embodiments, the method comprises removing snow from the vehicle or a different vehicle subsequent to mounting the second edge cap to the snow removal paddle.

In some embodiments, the snow paddle kit is more efficient at removing snow subsequent to mounting the second edge cap to the snow removal paddle than prior to removing the first edge cap from the snow removal paddle.

In some embodiments, the method comprises storing the snow paddle kit prior to mounting the second edge cap to the snow removal paddle, wherein: the snow paddle kit has a first storage size prior to mounting the second edge cap to the snow removal paddle; the snow paddle kit has a second storage size subsequent to mounting the second edge cap to the snow removal paddle; and the second storage size is substantially greater than the first storage size.

The process parameters, functions, system features, and sequence of steps described and/or illustrated herein are given by way of example only and may be varied and mixed and matched as desired. The various exemplary methods described and/or illustrated herein may also omit one or more of the steps described or illustrated herein or include additional steps in addition to those disclosed.

Unless otherwise noted, the terms “a” or “an,” as used in the specification and claims, are to be construed as meaning “at least one of.” In addition, for ease of use, the words “including” and “having,” as used in the specification and claims, are interchangeable with and have the same meaning as the word “comprising.” Also, as used herein, including in the claims, “or” as used in a list of items prefaced by “at least one of” indicates a disjunctive list such that, for example, a list of “at least one of A, B, or C” means A or B or C or AB or AC or BC or ABC (i.e., A and B and C).

Unless otherwise indicated, all numbers or expressions, such as those expressing dimensions, physical characteristics, and the like, used in the specification (other than the claims) are understood to be alternately modified in all instances by the term “approximately.” At the very least, and not as an attempt to limit the application of the doctrine of equivalents to the claims, each numerical parameter recited in the specification or claims which alternately modified by the term “approximately” should at least be construed in light of the number of recited significant digits and by applying ordinary rounding techniques.

All dimensions herein or in the Figures can be varied for varying circumstances, uses, and objects. They may be varied by ranges of plus or minus 0.01% through up to 1000% or even higher—also with the ranges in some embodiments varying by differing amounts for differing components.

As used in this specification, the term “laterally extending” means along a length of a referenced component that is at least fifty percent longer than the width of the component.

A statement of a numerical range includes a sub-statement all possible sub-ranges within the stated range.

What is claimed:

1. A method of using a snow paddle kit, comprising:

providing a snow paddle kit that comprises a snow removal paddle and a first edge cap mounted to a lower edge of the snow removal paddle;

removing the first edge cap from the snow removal paddle; and mounting a second edge cap to the snow removal paddle, wherein:

the first edge cap has a width, which is the longest dimension of the first edge cap;

the second edge cap has a width, which is the longest dimension of the second edge cap;

the lower edge of the snow removal paddle has a width, which is the longest dimension of the lower edge;

the width of the first edge cap is not substantially wider than the width of the lower edge of the snow removal paddle; and the width of the second edge cap is substantially wider than the width of the lower edge of the snow removal paddle.

2. The method of claim 1, comprising:

removing snow from a vehicle prior to removing the first edge cap from the snow removal paddle; and removing snow from the vehicle or a different vehicle subsequent to mounting the second edge cap to the snow removal paddle, wherein:

the snow paddle kit is more efficient at removing snow subsequent to mounting the second edge cap to the snow removal paddle than prior to removing the first edge cap from the snow removal paddle.

3. The method of claim 1, comprising storing the snow paddle kit prior to mounting the second edge cap to the snow removal paddle, wherein:

the snow paddle kit has a first storage size prior to mounting the second edge cap to the snow removal paddle;

the snow paddle kit has a second storage size subsequent to mounting the second edge cap to the snow removal paddle; and the second storage size is substantially greater than the first storage size.

4. A snow paddle kit, comprising a snow removal paddle, a handle mountable to the snow removal paddle, and an edge cap mountable to a lower edge of the snow removal paddle, wherein:

the edge cap has a width, which is the longest dimension of the edge cap;

the lower edge of the snow removal paddle has a width, which is the longest dimension of the lower edge; and the width of the edge cap is substantially wider than the width of the lower edge of the snow removal paddle.

5. The snow paddle kit of claim 4, wherein the width of the edge cap is at least 10 centimeters wider than the width of the lower edge of the snow removal paddle.

6. The snow paddle kit of claim 4, wherein the width of the edge cap is at least 50 percent wider than the width of the lower edge of the snow removal paddle.

7. The snow paddle kit of claim 4, wherein:

the edge cap has a durometer shore 00 rating of at least 30 and up to 80; and the edge cap has a mass of at least 100 grams and up to 200 grams.

8. A snow paddle kit, comprising a snow removal paddle, a handle mountable to the snow removal paddle, and an edge cap mountable to a lower edge of the snow removal paddle, wherein:

the snow removal paddle has a snow-facing surface when the edge cap is not mounted on the snow removal paddle;

the snow-facing surface of the snow removal paddle has a first surface area;

the snow paddle kit has a snow-facing surface when the edge cap is mounted on the snow removal paddle;

the snow-facing surface of the snow paddle kit has a second surface area; and the second surface area is at least 100 square centimeters greater than the first surface area.

9. The snow paddle kit of claim 8, wherein:

the snow removal paddle has a snow-facing surface;

the snow removal paddle comprises at least two one tab that extends from the snow-facing surface;

the snow removal paddle has a back opposite the snow facing surface;

the back comprises at least one tab that extends from the snow-facing surface;

the edge cap has two faces that are opposite each other and that each comprise at least one aperture; and when the edge cap is mounted to the snow removal paddle, then (1) the at least one aperture of one face of the edge cap receive the at least one tab of the snow-facing surface, and (2) the at least one aperture of the other face of the edge cap receive the at least one tab of the back of the snow removal paddle.

10. A snow paddle kit, comprising a snow removal paddle, a handle mountable to the snow removal paddle, and an edge cap mountable to a lower edge of the snow removal paddle, wherein:

the edge cap and the snow removal paddle have a profile, which is a projection of the edge cap and the snow removal paddle into a 2-dimensional plane when the edge cap is mounted to the snow removal paddle;

the edge cap has a lower surface configured to contact a vehicle, and the profile comprises a boundary that circumscribes the profile;

a lower surface projection of the lower surface into the 2-dimensional plane forms a portion of the boundary of the profile;

the profile has a distal surface, which is bounded by (1) the lower surface projection, (2) a distal line that is both parallel to and at least 5 centimeters from the lower surface projection, and (3) two segments of the boundary that extend from the lower surface projection to intersect the distal line;

the profile has a proximal surface, which is bounded by (1) an intermediate line that is both parallel to and at least 15 centimeters from the lower surface projection, (2) a proximal line that is both parallel to and at least 20 centimeters from the lower surface projection, and (3) two segments of the boundary that intersect the intermediate line and the proximal line;

the profile has an intermediate surface, which is bounded by (1) the intermediate line, (2) a second intermediate line that is both parallel to and at least 10 centimeters from the lower surface projection, and (3) two segments of the boundary that intersect the intermediate line and the second intermediate line;

the distal surface has a distal surface area, the proximal surface has a proximal surface area, and the intermediate surface has an intermediate surface area;

the distal surface area is at least 1.5 times and up to 1.9 times the size of the proximal surface area;

the distal surface area is at least 1.5 times and up to 1.9 times the size of the intermediate surface area;

the profile has an arm width, which is a maximum distance measured parallel to the lower surface projection and between the two segments of the boundary that extend from the lower surface projection to intersect the distal line; and the arm width is at least 35 centimeters and up to 70 centimeters.

11. A snow paddle kit, comprising a snow removal paddle, a handle mountable to the paddle, and an edge cap mountable to a lower edge of the paddle, wherein:

the edge cap and the snow removal paddle have a profile, which is a projection of the edge cap and the snow removal paddle into a 2-dimensional plane when the edge cap is mounted to the snow removal paddle;

the profile comprises a boundary that circumscribes the profile;

a lower surface projection of a lower surface of the edge cap into the 2-dimensional plane forms a portion of the boundary of the profile;

the profile has a distal surface, which is bounded by (1) the lower surface projection, (2) a distal line that is both parallel to and at least 5 centimeters from the lower surface projection, and (3) two segments of the boundary that extend from the lower surface projection to intersect the distal line;

the profile has a proximal surface, which is bounded by (1) an intermediate line that is both parallel to and at least 15 centimeters from the lower surface projection, (2) a proximal line that is both parallel to and at least 20 centimeters from the lower surface projection, and (3) two segments of the boundary that intersect the intermediate line and the proximal line;

the distal surface has a distal surface area, and the proximal surface has a proximal surface area;

the distal surface area is at least 1.5 times and up to 1.9 times the size of the proximal surface area;

the profile has an arm width, which is a maximum distance measured parallel to the lower surface projection and between the two segments of the boundary that extend from the lower surface projection to intersect the distal line; and the arm width is at least 35 centimeters.

12. The snow paddle kit of claim 11, wherein:

the profile has a neck width, which is a minimum distance measured parallel to the lower surface projection and between two segments of the boundary that extend from the lower surface projection to intersect the intermediate line; and the neck width is at least 10 centimeters and up to 80 percent of the lower arm width.

13. The snow paddle kit of claim 12, wherein:

the neck width is at least 15 centimeters and up to 30 centimeters; and the arm width is at least 40 centimeters and up to 70 centimeters.

14. The snow paddle kit of claim 12, wherein the arm width is at least 15 centimeters and up to 35 centimeters greater than the neck width.

15. The snow paddle kit of claim 12, wherein the arm width is at least 1.5 times and up to 2.0 times the neck width.

16. The snow paddle kit of claim 11, wherein the distal surface area is at least 200 square centimeters and up to 300 square centimeters.

17. The snow paddle kit of claim 11, wherein the proximal surface area is at least 100 square centimeters and up to 175 square centimeters.

18. The snow paddle kit of claim 11, wherein:

the profile has an intermediate surface, which is bounded by (1) the intermediate line, (2) a second intermediate line that is both parallel to and 10 centimeters from the lower surface projection, and (3) two segments of the boundary that intersect the intermediate line and the second intermediate line; and the intermediate surface has an intermediate surface area of at least 100 square centimeters and up to 175 square centimeters.

19. The snow paddle kit of claim 11, wherein:

the profile has a lower paddle surface, which is bounded by the lower surface projection, the proximal line, and two boundary segments that extend from the lower surface projection to intersect the proximal line;

and the lower paddle surface has a surface area of at least 600 square centimeters and up to 800 square centimeters.

20. The snow paddle kit of claim 11, wherein:

the distal surface has a convex shape;

the two segments of the boundary that extend from the lower surface projection to intersect the distal line each comprise a rounded, convex corner; and the proximal surface is an isosceles trapezoid that is optionally a rectangle.

21. The snow paddle kit of claim 11, wherein:

the profile has a second intermediate surface, which is bounded by (1) the distal line, (2) a second intermediate line that is both parallel to and 10 centimeters from the lower surface projection, and (3) two segments of the boundary that intersect the intermediate line and the second intermediate line; and the second intermediate surface has a concave shape.

22. The snow paddle kit of claim 21, wherein the two segments of the boundary that intersect the distal line and the second intermediate line each comprise an angled, concave corner.

23. The snow paddle kit of claim 22, wherein:

an upper surface projection of an upper surface of the edge cap into the 2-dimensional plane forms a portion of the boundary of the profile;

two side surface projections of two side surfaces of the snow removal paddle into the 2-dimensional plane form a portion of the boundary of the profile; and each angled, concave corner is defined by a point at which the upper surface projection of the edge cap meets a side surface projection of the snow remove paddle.

24. The snow paddle kit of claim 21, wherein the two segments of the boundary that intersect the distal line and the second intermediate line each comprise a rounded, convex corner.

25. The snow paddle kit of claim 11, comprising a scraper edge, wherein:

a scraper edge projection of the scraper edge into the 2-dimensional plane forms a portion of the boundary of the profile;

the scraper edge projection has a length that is measured parallel to the lower surface projection; and the arm width is at least 2.0 times the length of the scraper edge projection.

26. The snow paddle kit of claim 11, wherein the edge cap has a mass of at least 135 grams.

27. The snow paddle kit of claim 11, wherein the edge cap has a mass of at least 135 grams and no greater than 200 grams.

28. The snow paddle kit of claim 11, wherein:

an upper surface projection of an upper surface of the edge cap into the 2-dimensional plane forms a portion of the boundary of the profile; and the distance between the lower surface projection and the upper surface projection and perpendicular to the both the lower surface projection and the upper surface projection is at least 4 centimeters and up to 10 centimeters.

29. The snow paddle kit of claim 11, wherein:

the projection has an inverted T shape;

an edge cap projection of the edge cap into the 2-dimensional plane forms arms of the inverted T shape; and a snow removal paddle projection of the snow removal paddle into the 2-dimensional plane forms a stalk of the inverted T shape.

* * * * *